F. SCHNACKEL.
ANTISKID DEVICE FOR TIRES.
APPLICATION FILED MAR. 7, 1912.

1,106,896.

Patented Aug. 11, 1914.

Witnesses
L. M. Simms.
Ada M. Whitmore

Inventor
Frank Schnackel
By H. H. Simms
his Attorney

UNITED STATES PATENT OFFICE.

FRANK SCHNACKEL, OF ROCHESTER, NEW YORK.

ANTISKID DEVICE FOR TIRES.

1,106,896.  Specification of Letters Patent.  Patented Aug. 11, 1914.

Application filed March 7, 1912. Serial No. 682,100.

*To all whom it may concern:*

Be it known that I, FRANK SCHNACKEL, of Rochester, in the county of Monroe and State of New York, have invented a new and useful Improvement in Antiskid Devices for Tires, which improvement is fully set forth in the following specification and shown in the accompanying drawings.

The present invention relates to antiskid devices for vehicle tires and more particularly to the type in which there is employed a clamp for securing the device to a vehicle wheel and a flexible chain or the like extending transversely of the tire and secured at its ends to the clamp; an object of the invention being to provide a construction of clamp to which an ordinary link chain may be connected without the provision of hooks or other fastening means on said chain for the purpose of securing the latter to the clamp, thus permitting the chain to be replaced by the usual commercial link chain.

Another object of the invention is to provide a construction in which the chain may be quickly detached without detaching the clamping device.

To these and other ends the invention consists in certain parts and combinations of parts all of which will be hereinafter described, the novel features being pointed out in the appended claim.

Figure 1:
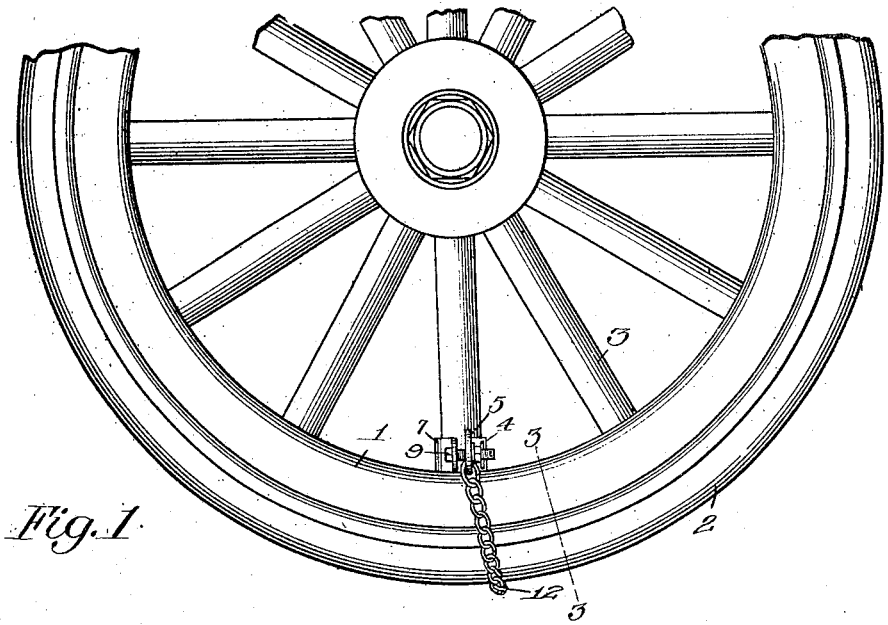
Figure 2:
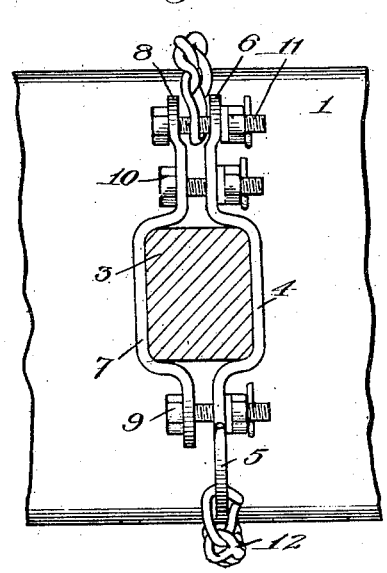
Figure 3:
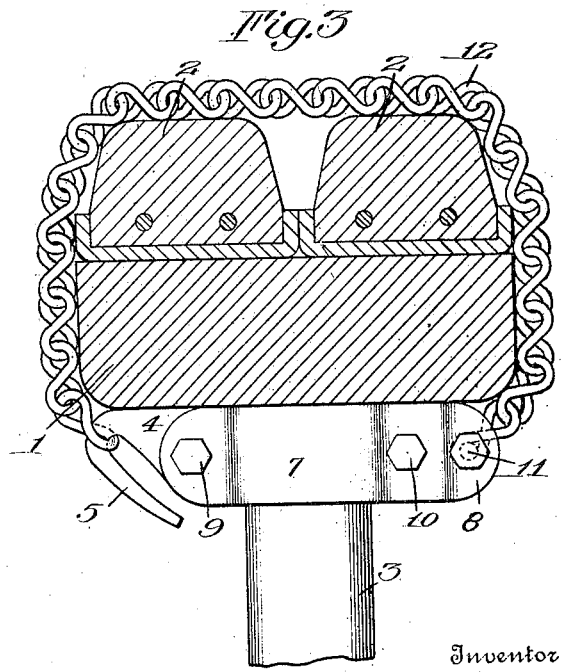

In the drawings: Figure 1 is a side view of a portion of a wheel with the improved device attached thereto; Fig. 2 is a detail sectional view through a spoke showing the clamp in position thereon; Fig. 3 is a cross sectional view of the rim in proximity to the antiskid device.

Referring more particularly to the drawings, 1 indicates the rim having, in this instance, two rubber tires 2, and 3 indicates the spokes of the wheel. To one of the spokes is secured the clamping device which, in this instance, consists of two clamping members in the form of bars. One of said members embodies a recessed portion 4 and has at one end a hook 5 while its opposite end is provided with a deflected portion 6. The other clamping bar is provided with a recessed portion 7 like the recessed portion 4 and is also provided with a deflected portion 8. The means for holding the clamping members together, in this instance, comprises two bolts 9 and 10 passed through eyes or openings in the clamping members upon opposite sides of the recessed portions 4 and 7, the openings for the bolt 10 being provided between the deflected portions 6 and 8 and the recessed portions 4 and 7, while the opening in the first described clamping member for the passage of bolt 9 is provided between the recessed portion 4 and the hook 5. The deflected portions 6 and 8 are also perforated in alinement with each other for the passage of a pin 11, in this instance, in the form of a bolt with a nut thereon. The gripping element is, in this instance, in the form of a twisted link chain 12 of a usual commercial construction. The link at one end of this chain is passed over the hook 5 while the link at the other end of the chain, after the latter has been passed about the tread portion of the rim, is fitted between the deflected portions 6 and 8 of the clamping bars and the pin 11 passed through such link and through the openings in the deflected portions 6 and 8. Any suitable number of these devices may be applied to the vehicle wheel. The clamp of each is first applied to a spoke and then a chain is passed about the tread of the tire and secured at its ends to the clamp in such a manner that the chain may have a slight sidewise movement. To remove the chain, it is merely necessary to remove the pin 11, thus freeing one end immediately and permitting the other end to slip from the hook.

From the foregoing it will be seen that the clamp permits the use of an ordinary link chain without the provision of hooks or other securing devices thereon for attachment to the clamp. The device also permits the ready detachment of the chain, without the removal of the clamping device, a result which is very desirable for it enables the user of the vehicle to employ the antiskid device only when necessary.

What I claim as my invention and desire to secure by Letters Patent is:

. An anti-skid device for vehicle tires comprising two clamping bars each formed with a recess between its ends, one of said bars having a hook at one end with its opposite end laterally deflected, the other bar having a laterally deflected portion opposed to the deflected portion of the first mentioned bar, the deflected portions having alined perforations, a bolt connecting the bars on one side of said recessed portions, another bolt connecting the bars on the other side of said recessed portions between the recessed portions and said laterally deflected portions, a link chain having one of its links passed over said hook and having a link at its other
5 end projected in between the laterally deflected portions of the clamping bars, and a pin passed through the perforations of the laterally deflected portions and through said last mentioned link of the chain.

FRANK SCHNACKEL.

Witnesses:
 HAROLD H. SIMMS,
 ADA M. WHITMORE.